July 14, 1959    L. T. ROSENBERG    2,895,065
SEGMENTAL AIR GAP BAFFLE
Filed Nov. 15, 1957
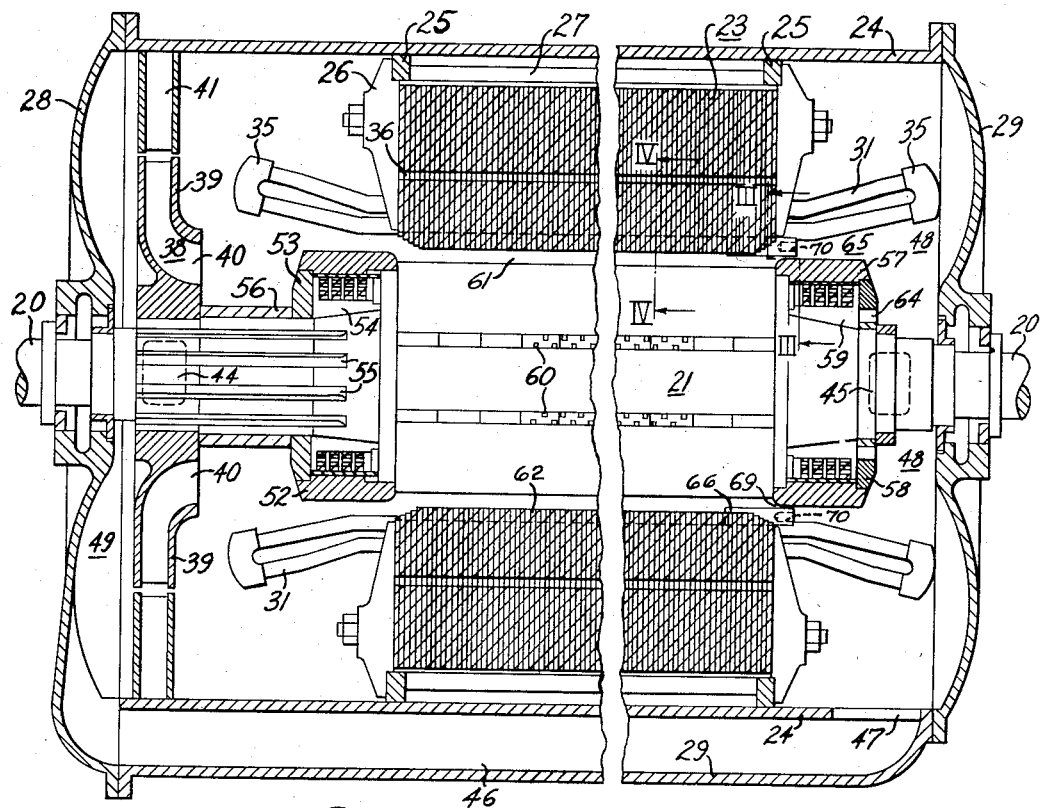
Fig. 1
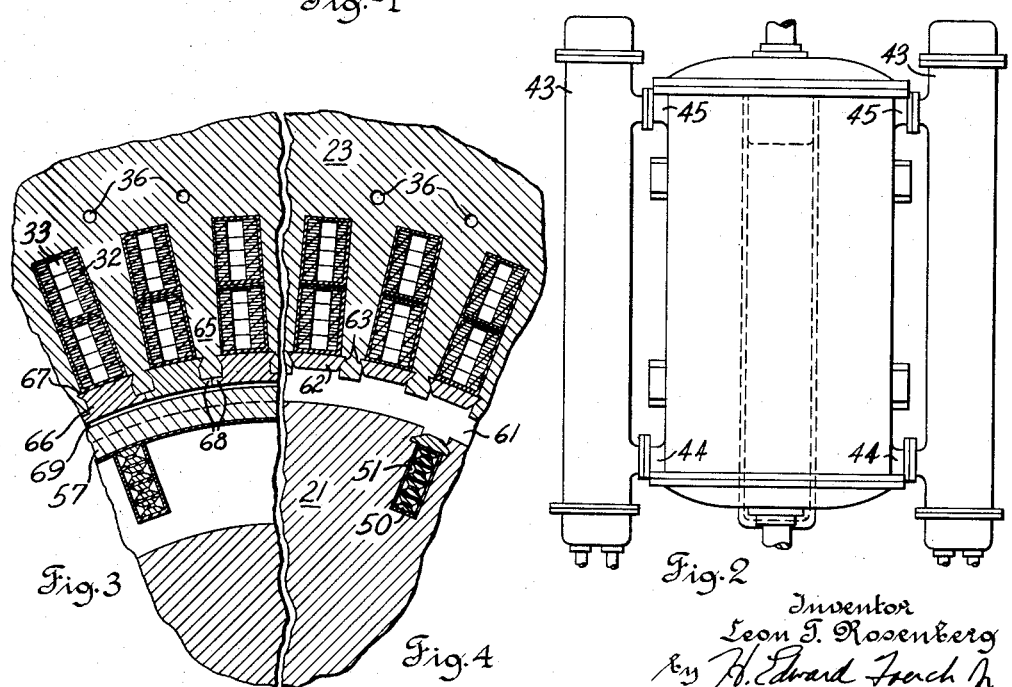
Fig. 3         Fig. 2
        Fig. 4
Inventor
Leon T. Rosenberg
By H. Edward French, Jr.
Attorney United States Patent Office 2,895,065
Patented July 14, 1959

2,895,065

SEGMENTAL AIR GAP BAFFLE

Leon T. Rosenberg, Wauwatosa, Wis., assignor to Allis-Chalmers Manufacturing Company, Milwaukee, Wis.

Application November 15, 1957, Serial No. 696,829

4 Claims. (Cl. 310—64)

This invention relates to an improved air gap baffle for dynamoelectric machines having high differential gas pressures. More particularly, this invention relates to an improved air gap baffle construction in which the baffle is formed by segments held firmly by the stator slot wedge notches.

In conductor cooled dynamoelectric machines, that is, machines having cooling ducts within the winding insulation directly cooling the winding conductors, it is usual to provide fan means having a high differential gas pressure to force the cooling gas through the long ducts of small cross section. When such high differential gas pressures are used, a baffle is sometimes provided to restrict the flow of cooling gas through the air gap between the stator and rotor because such a flow of cooling gas would bypass the winding and more cooling ducts and produce little useful cooling.

Prior air gap baffles have been formed by a one piece ring fastened to the stator windings at the end of the core, sometimes having a ring of rubber or similar material fastened to the inner periphery to form a narrow annular orifice around the rotor surface. These former baffles have presented a number of problems relating to mounting, rotor removal and installation, adjustability and, in the case of the rubber baffle, reliability of the flexible gasket. The one piece rings were also subject to elliptical distortion with the hazard of rubs and uneven orifice width around the periphery.

According to the present invention, an air gap baffle is provided which comprises segments securely held in the stator slot wedge notches. These segments extend radially toward the rotor to form an annular restriction to the flow of cooling gas through the air gap. Proper selection of the segment radial dimension permits adjustment of the restriction to provide a uniform clearance with the rotor around its circumference. The segments are provided wtih tapped holes for installation and removal with the rotor in place.

The present means for restricting the gas flow through the air gap comprising a plurality of segments has the advantages of being less expensive to manufacture than a single large diameter Bakelite ring of phenolic material and a single rubber ring baffle. The segments are easier to install and align than a single ring. They may be inserted after the rotor has been installed whereas when a one piece baffle is used, the baffle must be installed before the rotor is inserted greatly limiting the opening through which the rotor is installed. Also, the air gap segments can be adjusted by inserting segments of different radial dimension with the rotor in place, and in this manner the baffle can more accurately control the flow of cooling gas through the air gap.

It is therefore an object of the present invention to provide an improved air gap baffle for dynamoelectric machines having high differential gas pressures.

Another object of this present invention is to provide an improved air gap baffle for dynamoelectric machines which may be installed after the rotor is installed.

Another object of the present invention is to provide an improved air gap baffle for dynamoelectric machines which may be installed after the rotor is installed.

Another object of the present invention is to provide an improved air gap baffle for dynamoelectric machines which is inexpensive, easily replaced and provides adjustment of the air gap orifice without removing the rotor.

Objects and advantages other than those above stated will be apparent from the following description when read in connection with the accompanying drawing, in which:

Fig. 1 is a sectional view of a dynamoelectric machine embodying the segmental baffle of the present invention;

Fig. 2 is a plan view of the dynamolectric machine shown in Fig. 1;

Fig. 3 is a fragmental sectional view along lines III—III of Fig. 1 showing the positioning of the segmental baffle of the present invention; and Fig. 4 is a fragmental sectional view showing the winding construction taken along lines IV—IV of Fig. 1.

Referring to the drawing, the totally enclosed dynamoelectric machine, such as the turbogenerator shown in Fig. 1, comprises a rotating field member or rotor mounted on or integral with a rotatable shaft 20 supported in suitable bearings. The rotor comprises a slotted magnetic core 21 provided with a field winding. The bearings support the rotor core 21 in coaxial relation with the stator to form an air gap therebetween.

The stator comprises a slotted laminated core 23 mounted in a stationary support. The stationary support comprises a cylindrical frame 24 and radial annular support plates 25 secured to the inner periphery of the frame to supoprt longitudinally extending bars 27 on which the stator core laminations are assembled. Clamping members 26 hold the laminations together in their assembled position. End bells 28, 29 are secured to the ends of frame 24 and their radially inner portions are provided with suitable shaft seals. The end bells and the casings form a totally enclosed housing for the machine which is normally fillable with a light density gas such as hydrogen. The gas may have an average pressure equal to atmospheric pressure or any suitable average pressure such as 30 pounds per square inch above atmosphere.

Axially extending armature winding 31 extending through the stator core 23 may comprise any suitable ventilated arrangement in which the ventilating gas has direct contact or substantially direct contact with the conductors, and preferably comprises a stranded arrangement as shown in Fig. 3 in which copper or aluminum strands 32 are stacked in two rows on opposite sides of the slot. To reduce eddy currents in the conductors, the strands 32 are preferably coated with insulating material and transposed within the slot. The two stacks of strands are spaced by a plurality of high resistivity tubes 33 which extend in a row longitudinally of the conductors. The end connection joining two conductors extending in different slots comprises a copper clip 35 which envelops the spaced end portions of the two conductors. The ends of the tubes 33 extend as in a window of the clip 35 so that ventilating gas can enter the tube openings and pass through the tubes in good heat conducting relation to the strands of the conductors from one end of the machine to the other.

The stator core 23 is provided with axial ventilating ducts through the laminated core comprising aligned holes in the laminations forming ducts 36 which open to the ends of the core between clamping fingers 26 and adjacent to core slots containing stator windings. These ducts 36 are relatively small in transverse cross section so they pass only a limited proportion of the stator ventilating gas between the ends of the machine. The sizes of the stator ducts 36 and the ducts formed by tubes 33 are relatively proportioned so that the relative amounts of ventilating gas passed therethrough maintain the stator core and the stator ducts at substantially the same temperature when the machine is operated near rated load thereby substantially eliminating differential expansion between the conductors and the iron of the stator core.

Ventilating gas is circulated through the machine by blower means comprising a single high pressure blower 38 mounted on the shaft 20 at one end of the machine between the end bell 28 and the rotor and stator cores. The blower 38 may be a multiple stage centrifugal blower but is preferably a single stage blower having the single impeller 39 whose diameter is greater than the diameter of the inner periphery of the stator core. The inlet 40 to the impeller 39 is located centrally thereof along the shaft and on the side adjacent the cores. Radially aligned with the impeller 39 is an annular diffuser 41 mounted on the inner circumference of the casing 24.

Heat in the circulated ventilating gas is absorbed by one or more coolers 43 which may be disposed in the housing but as shown are disposed longitudinally of the machine and outside of the machine housing as seen in Fig. 2. Opposite end portions of each cooler are connected through ports in the housing by suitable ducts 44, 45. Duct 44 opens in the diffuser region of the blower to receive ventilating gas therefrom, and duct 45 opens into the region 48 adjacent end bell 29 to supply cool ventilating gas under relatively high pressure to the axial ventilating passages in the rotor and stator cores. A wall 29 integral with housing 24 and externally thereof forms a longitudinal duct 46 which is connected by a port 47 in casing 24 to the high pressure gas region 48 adjacent end belt 29. The other end of duct 46 opens to another high pressure gas region 49 between end bell 28 and blower 38 to supply ventilating gas to the blower end of the rotor duct.

For the most effective rotor ventilation the rotor windings are constructed and arranged in slots of the rotor core 21 to provide ventilating ducts 51, Fig. 4, bringing the ventilating gas into direct contact with the metal of the rotor winding conductors 50. The conductors of the axially extending rotor windings have their end turn portions held in place at the blower end of the core by a retaining ring 52 and by an end plate 53 which together with the shaft 20 and the adjacent end of the rotor core define an enclosed space 54 for receiving supercharged ventilating gas. Duct means which connect enclosed space 54 with the pressure chamber 49 comprise axial ducts in the shaft formed by flutes 55 in the shaft. The mounting for blower 38 cooperates with a cylinder 56 to enclose flutes 55 so the ducts formed thereby open only into pressure chamber 49 and into space 54 enclosing the rotor end turns.

At the other end of the shaft 20, the rotor end turn portions are also secured by a retaining ring 57 and an end plate 58. End plate 58 has apertures 64 therein to permit ventilating gas to flow from pressure region 48 into a space 59 defined by end plate 58, retaining ring 57, the rotor core 21 and the shaft 20. The end turn retaining rings 52, 57 normally extend radially beyond the circumference of the rotor core as seen in Fig. 1.

Radial ventilating passages 60 shown in Fig. 1 at the center of the rotor connect the axial ventilating ducts 51 of the rotor with the air gap 61 of the machine. The radial passages 60 are located immediate the ends of slot portions of the rotor conductors and may be spaced throughout the length of the core or concentrated at the central portion thereof.

Armature winding 31 is held in the stator slot in the usual manner by slot wedges 62 which are driven into stator slot wedge notches 63 from one end of the stator before the rotor is installed. Notches 63 are provided in each wall of the stator core slot and are near the radially inner end thereof. The stator slot wedges 62 are formed of an insulating material having sufficient mechanical strength and rigidity to hold the insulated conductors of the winding 31 in the stator winding slot. These wedges 62 normally extend from one end of the stator core to the other end.

Baffle means 65 are provided in the air gap for restricting the flow of ventilating gas from chamber 48 at the high gas pressure end of the machine through the air gap 61 in parallel with the stator winding cooling ducts 33 and the rotor winding cooling ducts 51. This baffle means 65 according to the present invention preferably comprises segments 66 which cooperate to form an annular restriction in air gap 61. The segments 66 include a trapezoidal portion 67 formed to correspond to the shape of the stator slot wedge notches 63.

In the present machine the stator slot wedges 62 preferably extend to the end of the core 23 at the end of the machine at which the blower 39 is located and extend to within a few inches of the end of the stator core 23 at the other end of the machine, thus leaving space in the slot wedge notches 63 for the air gap baffle segments 66. Each segment 66 is provided with a lip 68 which extends radially beyond the inner circumference of the stator core and extends circumferentially a distance equal to approximately half the circumferential width of a stator core tooth formed by the winding slots. When the segments 66 are positioned in the wedge slot notches 63, adjacent segment lips 68 cooperate to form a complete baffle restricting the flow of cooling gas into the air gap 61. The clearance between individual segments 66 and the rotor end turn retaining ring 57 may be adjusted to produce a uniform orifice 69 by selecting segments 66 with a lip 68 having the desired radial dimension.

Means comprising tapped holes 70, as shown in Fig. 1, are provided for positioning the segments 66 in the wedge slot notches 63 and removing them therefrom. A single tapped hole 70 located centrally of the end of the segments 66 has been found to be sufficient. By this means, the segments 66 can be positioned in the slot wedge notches 63 and the orifice between the baffle means 65 and the rotor end winding retaining ring 57 can be adjusted while the rotor 21 is in place.

In operation of the turbogenerator at normal speeds the supercharger or blower 38 develops a differential pressure of at least eight inches of water when hydrogen at atmospheric pressure is the ventilating gas. The blower is a suction type blower which forces ventilating gas through coolers 43 to the pressure chambers 48, 49. From the pressure chamber 48, the blower draws the ventilating gas in parallel paths and at high velocity through the axial ducts 36 in the stator lamination and through the axial ducts 33 formed by tubes 43 in the armature winding 31 from one end of the machine to the other where the gas returns to the inlet of the blower. The blower also draws ventilating gas from the pressure chamber 48 into enclosed space 59 and from pressure chamber 49 through flutes 55 into enclosed space 54. From these enclosed spaces 54, 59 the blower causes the ventilating gas to enter both ends of the rotor into the ducts 51 in the conductors, to flow at high velocity through the ducts 51 and to discharge through radial passages 60 into the air gap 61 for return to the blower 38. The flow of cooling gas through the air gap 61 from chamber 48 to the intake for the blower, has been restricted by baffle means 65, and therefore substantially all of the cooling gas is caused to flow through the winding cooling ducts 33, 51 and the core cooling ducts 36 to do useful cooling in the machine. As the baffle means 65 comprising segments 66 may be installed after the rotor 21 has been installed and aligned in its bearings, an accurate adjustment of the air gap orifice between the baffle means 65 and the rotor end turn retaining ring 57 is possible.

While only a single embodiment of the present invention has been shown and described, other embodiments will be apparent to one skilled in the art without departing from the spirit of the invention or the scope of the appended claims.

What is claimed is:

1. In a dynamoelectric machine, a housing containing a cooling gas, a stator core having slots, a winding in said stator slots having cooling ducts extending axially from one end to the other of said winding and in substantially direct contact with the conductors thereof, a rotor cooperating with said stator core to form an air gap therebetween, means producing a high differential gas pressure for forcing cooling gas through said axially extending ducts from a first end of said machine to a second end thereof, means restricting gas flow into said air gap from said first end comprising segments positioned in the radially inner portion of each of said stator slots, each of said segments having a lip portion cooperating with the lip portions of said other segments to form an annular baffle extending into said air gap.

2. In a dynamoelectric machine, a housing containing a cooling gas, a stator core having slots, a winding in said stator slots having cooling ducts extending axially and from one end to the other of said winding and in substantially direct contact with the conductor thereof, a rotor cooperating with said stator core to form an air gap therebetween, means producing a high differential gas pressure forcing cooling gas through said axially extending ducts from one end of said machine to the second end thereof, means restricting gas flow into said air gap from said first end comprising segments positioned in said slots, each of said segments having a lip portion extending into said air gap, said lip portions cooperating with the lip portions of said other segments to form an annular baffle having a selected clearance with said rotor to restrict the flow of cooling gas into said air gap.

3. In a dynamoelectric machine, a housing containing a cooling gas, a stator core having slots, a winding in said slots having cooling ducts extending axially from one end to the other of said winding and in substantially direct contact with the conductors thereof, a rotor core cooperating with said stator core to form an air gap therebetween, means producing a high differential gas pressure for forcing cooling gas through said axially extending ducts from a first end to a second end thereof, said rotor winding having an end turn portion, a rotor end turn retaining ring surrounding said end turn portions and extending radially beyond said rotor core, said stator slots extending to said air gap and having notches in each wall thereof near the radially inner end, baffle means in said air gap at the first end of said machine comprising segments having a wedge shaped portion positionable in said stator slot notches, each of said segments further having a lip portion extending into said air gap, said lip portions cooperating to form an annular baffle having a selected clearance with said rotor winding retaining ring to restrict the flow of cooling gas into said air gap.

4. In a dynamoelectric machine, a housing containing a cooling gas, a stator core having slots, a winding in said slots having cooling ducts extending axially from one end to the other of said winding and in substantially direct contact with the conductors thereof, a rotor core cooperating with said stator core to form an air gap therebetween, means producing a high differential gas pressure for forcing cooling gas through said axially extending ducts from a first end to a second end thereof, said rotor winding having an end turn portion, a rotor end turn retaining ring surrounding said end turn portions and extending radially beyond said rotor core, said stator slots extending to said air gap and having notches in each wall thereof near the radially inner end, baffle means in said air gap at the first end of said machine comprising segments having a wedge shaped portion positionable in said stator slot notches, each of said segments further having a lip portion extending into said air gap, said lip portions cooperating to form an annular baffle having a selected clearance with said rotor winding retaining ring to restrict the flow of cooling gas into said air gap, said baffle means having means for installing and removing said baffle means from said notches.

References Cited in the file of this patent

UNITED STATES PATENTS

| 2,663,808 | Rosenberg | Dec. 22, 1953 |
| 2,707,244 | Kilgore | Apr. 26, 1955 |

UNITED STATES PATENT OFFICE

CERTIFICATE OF CORRECTION

Patent No. 2,895,065                                                 July 14, 1959

Leon T. Rosenberg

It is hereby certified that error appears in the printed specification of the above numbered patent requiring correction and that the said Letters Patent should read as corrected below.

Column 6, line 13, strike out "lected clearance with said rotor windii retaining ring to".

Signed and sealed this 1st day of December 1959.

(SEAL)
Attest:

KARL H. AXLINE                                                       ROBERT C. WATSON
Attesting Officer                                                 Commissioner of Patents